United States Patent
Marjadi et al.

(10) Patent No.: US 6,859,792 B1
(45) Date of Patent: Feb. 22, 2005

(54) PRODUCT SUITE LICENSING METHOD

(75) Inventors: Dhiren K. Marjadi, Bloomfield Hills, MI (US); James Scapa, West Bloomfield, MI (US); James E. Brancheau, Dearborn, MI (US)

(73) Assignee: Altair Engineering, Inc., Troy, MI (US)

(*) Notice: Subject to any disclaimer, the term of this patent is extended or adjusted under 35 U.S.C. 154(b) by 0 days.

(21) Appl. No.: 09/553,115

(22) Filed: Apr. 20, 2000

(51) Int. Cl.$^7$ .............................................. G06F 17/60
(52) U.S. Cl. ........................... 705/59; 705/51; 713/200; 713/201; 713/202
(58) Field of Search .................. 705/51, 59; 713/200, 713/201, 202

(56) References Cited

U.S. PATENT DOCUMENTS

| | | | |
|---|---|---|---|
| 5,260,999 A | * 11/1993 | Wyman | 705/59 |
| 5,390,297 A | 2/1995 | Barber et al. | 395/200 |
| 5,606,493 A | * 2/1997 | Duscher et al. | 700/5 |
| 5,671,412 A | 9/1997 | Christiano | 395/615 |
| 5,758,069 A | * 5/1998 | Olsen | 705/59 |
| 6,219,652 B1 | * 4/2001 | Carter et al. | 705/59 |
| 6,275,844 B1 | * 8/2001 | Rail | 709/102 |

FOREIGN PATENT DOCUMENTS

WO   WO 92/20021   * 10/1992

OTHER PUBLICATIONS

Macrovision, FLEXlm License Models, 2002/2003, www.macrovision.com/solutions/esd/flexlm/Immodels.shtml.*

* cited by examiner

Primary Examiner—John W. Hayes
Assistant Examiner—Kambiz Abdi
(74) Attorney, Agent, or Firm—Young & Basile, P.C.

(57) ABSTRACT

A license management method specifies a predetermined number of assigned units for each of a plurality of individually selectable programs in a product suite. A discrete node running total equals the assigned units of the highest assigned units program running on each node. Each node can run additional programs where the assigned units of the additional programs are equal to or less than the node running total without changing the node running total. Termination of the highest assigned units program on a node causes the difference between the assigned units of the terminated program and the next highest assigned units of a program running by the node to be re-added to the available units.

28 Claims, 6 Drawing Sheets

Figure 1

| PRODUCT | ASSIGNED UNITS | | UHD |
|---|---|---|---|
| A | 21 | | 1 |
| B | 21 | | 2 |
| C | 6 | | 3 |
| D | 50 | AVAILABLE UNITS | 4 |
| E | 4 | | 5 |
| F | 24 | | 6 |
| G | 21 | | 7 |
| H | 38 | | 8 |

PRODUCT SUITE LICENSING METHOD

BACKGROUND OF THE INVENTION

1. Field of the Invention

The present invention relates, in general, to license management programs suitable for licensing and managing the usage of computer software products.

2. Description of the Art

Although computer programs, individually also referred to as computer software products, can be sold to an end user, a more frequent approach is to license the software product or program to an end user, with the software vendor or owner retaining ownership of all of the rights to the computer product.

Each license is devised to control the usage of the computer product or software by stating the conditions under which the computer product may be used, such as the location of use, the number of times used, etc. Software products are licensed in many ways. By one category, licenses can be divided into node-locked licenses or network licenses. By another category, licenses can be divided into product licenses or product suite licenses. In general most licenses could be described by a combination or a simple variation thereof of the above two categories, i.e. node-locked product licenses, node-locked product suite licenses, network product licenses, and network product suite license.

Node-locked licenses restrict the use of software to a given computer. The major limitation of this approach is that it requires customer to purchase software separately for each potential user. Since each user does not use each software on his machine all the time, software purchased via this approach would idle most of the time. This is a very inefficient use of customers' money.

Network licenses allow access to the software products on computer networks formed of a number of interconnected computers or nodes which may be linked to each other and/or a central host. This addresses the primary inefficiency of node-locked licenses. The customer must now purchase licenses only to cover the anticipated number of peak simultaneous users of that software.

Product licensing restricts the use of the license to only the product for which it is valid. In other words, the license is not transferable to other products. The limitation of this approach is that a customer must purchase the peak licenses, either node-locked or network, for each product separately. Again, peaks usage for different product do not occur at the same time. Hence, the customer ends up purchasing more software licenses than really required.

Product suite licenses allow access to several software products using common licenses. A suite would generally include several individual programs which may be run concurrently with each other or individually and may or may not be linked to other programs in the suite. Traditional licensing approaches for computer programs or suites typically involve one license for all of the programs in each entire suite such that a user on a node of a computer network is charged with one license use regardless of which program the user is running from a particular program suite. A major limitation of this approach is that it assumes that each product in the suite has an equal value. Also, product suites typically involve a small number of software products which complement each other, and the expansion of suite licensing to license a wide range of software products is commercially impractical.

A recent development in licensing has been the units based licensing of multiple products. In such a system, different products are assigned a different values in terms of units. A customer would license a certain number of units to run any and all of these products. While on paper, this system appears to addresses limitations listed above, in reality it does not due to the manner in which it is implemented by several organizations. Under this setup, when a user runs multiple products, the user is charged multiple units, also called stacking of units. Since the customers have limited budgets for purchasing software products, this system (i) forces the users to terminate one product in order to run another, thus decreasing the user's efficiency, or (ii) forces the customer to purchase additional licenses with no additional value thus undermining the profitability of their organization. This system does not encourage users to try new products, even though they are accessible and available on their network.

Thus, it would be desirable to provide a licensing management method for licensing computer program suites which overcomes the limitations of previous licensing approaches insofar as providing licenses that maximize the return on customer's investment by minimizing the number of licenses users need to purchase and allowing easy transfer of licenses from one product to another. It would also be desirable to provide a licensing management method for licensing computer program suites that maximizes user efficiency by encouraging users to run multiple products simultaneously, by providing users with an easy access to a wide range of products, and by encouraging users to try new software products. It would also be desirable to provide a licensing management method for licensing computer program suites that can be easily implemented with existing licensing arrangements.

SUMMARY OF THE INVENTION

The present invention is a method for licensing a product suite containing a plurality of individual computer programs by a unique licensing arrangement which facilitates the use of new or additional programs without requiring additional licenses or interfering with the availability of programs in the product suite to other users on a computer network.

The licensing method is usable in a computer network of nodes, each node capable of operating a software program obtained from a program server, and includes the steps of:

a. providing a program suite formed of a plurality of software programs, b. assigning a predetermined number of assigned units to each program in the program suite, and c. setting a discrete node running total for each node equal to the highest assigned units program running on each respective node by leveling the number of units charged to each node to be equal to the highest assigned units program running on each node.

Each node is thereby capable of running additional programs where the assigned units of the additional programs are equal to or less than the node running total without changing the node running total.

In another aspect, the method includes the steps of:

d. providing a predetermined number of licensed units for use of the programs in the program suite, e. setting checked out units equal to the sum of all node running totals, f. setting an available units equal to the licensed units less the checked out units;

Upon one node requesting access to one program in the program suite, the leveling step includes:

g. determining a required number of units to access the requested program where the required units equal zero if the assigned units of the requested program are less than or equal to the node running total of the node requesting access to the requested program, and the required units equal the difference between the assigned units and the node running total when the assigned units are greater than the node running total, and h. comparing the required units with the available units and allowing access where the required units are less than or equal to the available units and denying access where the required units are greater than the available units.

In another aspect, upon one node terminating a run of one program currently running on the one node, the leveling step includes:

i. determining a returned number of units where the returned units equal zero if the assigned units of the terminated program are less than the node running total of the node terminating the program, and the returned units equal the difference between the assigned units of the terminated program and the next highest assigned units program running on the one node when the assigned units of the terminated program are equal to the node running total of the node terminating the program, and j. terminating the program, adding the returned units to the available units to compute the new available units, and subtracting the returned units from the node running total to compute the new node running total.

In another aspect of the present invention, the method further includes the step of repeating steps g and h for each node requesting access to a program in the program suite.

In another aspect of the present invention, the method further includes the step of determining the returned units for each node terminating a program from the program suite running on the node.

Further, preferably at least two of the programs in the program suite are assigned different numbers of assigned units.

In another aspect, the inventive method further comprises the steps of:

providing a predetermined number of licenses for each program in the program suite;

determining if a license is available for a requested program in the suite from a group of licenses for each program in the suite;

if a license is available, using the license and running the program;

if a license is not available for the requested program, determining if the required units for the requested program are greater than, equal to, or less than the available units;

if the required units for the requested program are less than or equal to the available units, running the requested program and deducting the required units from available units to compute the new available units, and if the required units are greater than the available units, denying access to the requested program and notifying the user.

In yet another aspect, the method comprises the steps of:

maintaining a distinct node running total for each node running a program from the program suite;

maintaining a total checked out units equal to the sum of all of the node running totals; and making the available units equal to the licensed units minus the total checked out units.

In another aspect, the licensing method includes the steps of:

providing a program suite formed of a plurality of software programs, the programs originating from at least two distinct sources, assigning a predetermined number of assigned units to each program in the program suite;

providing a predetermined number of licensed units for use of the programs in the program suite; and distributing revenue to the different sources of programs in the program suite.

In another aspect, the invention is a computer readable medium containing program instructions for implementing the method described above in its various aspects.

The unique licensing method of the present invention affords several advantages over the previously devised license management systems.

The licensed units purchased by the customer may be used for running any program in the program suite. Thus, instead of purchasing separate licenses to cover the peak usage of each individual product, the customer may license units to cover the peak level of checked out units. Since the peak usage of all products does not occur simultaneously, the peak checked out units are smaller than equivalent units corresponding to the sum of peaks of each individual license. This helps customers minimize the number of licenses/units they need to purchase.

The present licensing method is usable with product suites containing a plurality of individually selectable programs. Users do not have to request a separate authorization file for trying out new products. This provides users with an easy access to all programs included in the program suite.

The units leveling feature of the licensing method reduces the cost of trying new products. If the user is already running one or more products, the units cost of running a new product is equal to the required units. Since the required units is smaller, sometimes significantly smaller, than the assigned units, the units leveling feature encourages users to try new products without the fear of adversely affecting the work of other users.

The unique licensing method of the present invention also enable multiple copies of a single program in the program suite to be run at no additional requested units charge on the same node. This further increases the efficiency of a user.

The above advantages would gradually increase the usage of all programs in the program suite, which in turn would raise the peak checked out units. The value of the licensing management method described above encourages a licensee to purchase additional licensed units to insure a smooth operating network and, more importantly, a network in which all of the users have easy access to all of the programs in the program suite without delay.

BRIEF DESCRIPTION OF THE DRAWINGS

The various features, advantages and other uses of the present invention will become more apparent by referring to the detailed description and drawings in which.

DESCRIPTION OF THE PREFERRED EMBODIMENTS

Figure 1:
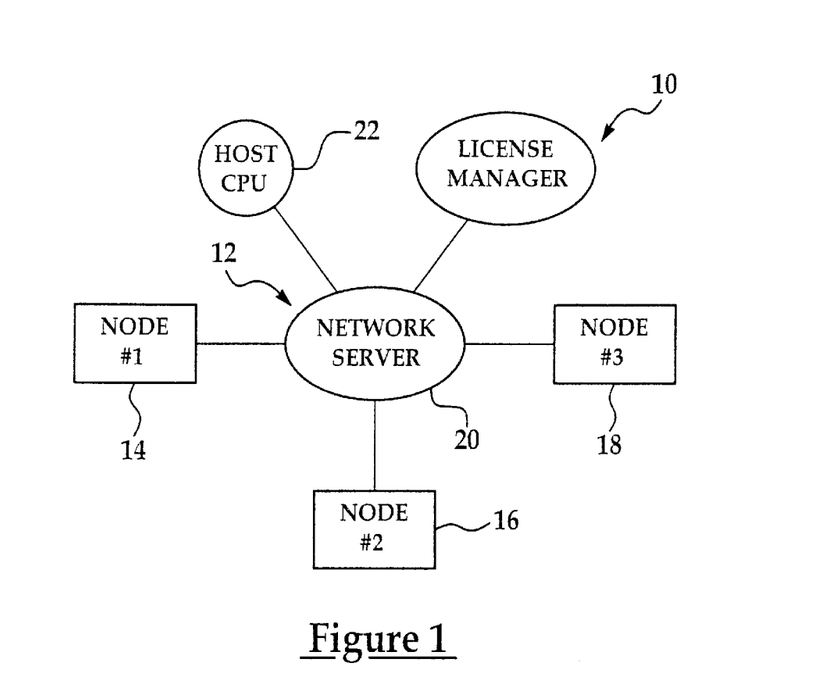
FIG. 1 is a pictorial representation of a conventional computer network capable of utilizing a license management method and apparatus according to the present invention.

Referring now to the drawing and to FIG. 1 in particular, there is depicted a license management apparatus and method, both hereinafter referred to as a license manager 10, which is suitable for controlling the access to a plurality of discrete computer software programs or products contained in a program suite in a computer network 12.

By way of example only, the network 12 includes a plurality of individual nodes, with three nodes 14, 16, and 18, being depicted by way of example only. Each of the nodes 14, 16, and 18 is connected to a network server 20 and has its own network address so that any one of the nodes 14, 16 and 18 can communicate with the each other node 14, 16, and 18 within the network 12.

The individual nodes, 14, 16, and 18 are connected to the network server 20 which itself is connected in data communication with a host CPU 22.

Although the individual nodes 14, 16, and 18 are connected in a spoke configuration to the network server 20, it will be understood that this arrangement is by example only as the individual nodes 14, 16, and 18 may be connected in a ring configuration or any other configuration found in computer networks. Further, the network server 20 and the host CPU 22 may be combined into a single computer.

As will be clearly understood by those in the relevant computer art, each of the nodes 14, 16, and 18, as well as the network server 20 and the host CPU 22, may be formed of a conventional central processing unit, such as the microprocessor, as well as standard computer components coupled to the CPU, including a memory, input components, such as a keyboard, etc., and output components, such as a screen display, printer, etc., not shown.

For the purpose of the present invention, a node is defined as a unique combination of a user, a CPU or host, and a display, hereafter referred to as an "UID". For example, UHD1 is user #1 on CPU #1 and display #1. The same user #1 on the same CPU or host #1, but with a different display #2 will be a separate, unique UHD, such as UHD2. A change in any one of the user, CPU or host, or display will result in a different UHD recognizable by the license manager 10.

The license manager 10 of the present invention is embodied in a software program which may be resident or stored in the memory of the network server 20 or the host CPU 22 and/or capable of being stored in a storage media, such as a disk, CD-Rom, etc. The license manager 10 may also be resident or stored in the memory of a separate central processing unit or microprocessor which is coupled to the network server 20 or the host CPU 22.

The function of the license manager 10, as described in greater detail hereafter, is to control access to as well as monitor the execution or running of a plurality of individual programs coupled together or sold as a program suite 24. The program suite 24 formed a plurality of individual programs which may be separately executable or executable in multiple numbers, and are resident in the memory of and/or a hard drive connected to the host CPU 22. In this arrangement, the network server 22 merely distributes an authorized licensed program from the program suite to the requesting UHD.

Figure 2:
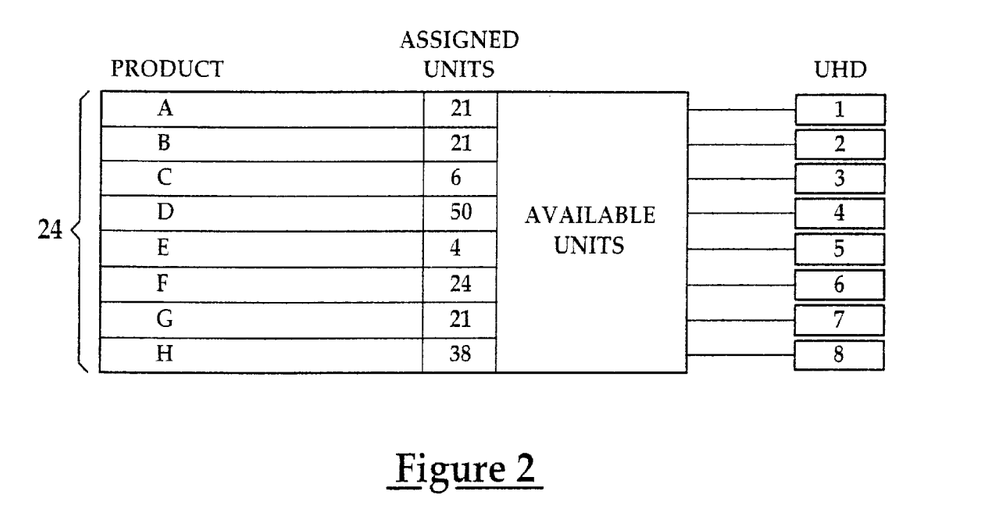
FIG. 2 is a pictorial representation of a computer program suite with assigned license units according to the present invention.

FIG. 2 depicts an example of a program suite 24 usable with the license manager 10 of the present invention. As shown therein, the program suite 24 includes a plurality of individually executable programs or products, labeled product A–H. The individual products A–H forming the program suite 24 may be sold by a single software vendor or combined by a user or a third-party into the program suite 24 due to common functionality of the programs, or for convenient use of the programs as a group of end users.

It will also be understood that although products A–H have been illustrated as forming the program suite 24, any number of individual programs may be used to form a program suite controlled by the license manager 10 of the present invention.

Before defining the details of the inventive product suite licensing method of the present invention, definitions of key terms will first be presented.

Licensed Units: The total number of units licensed by one customer.

Assigned Units: The value in terms of units assigned to each product or program in the Product Suite licensed by one customer.

UHD: A unique combination of one user ID, one CPU or host and one display device.

UHD running total: The total number of units checked out by one UHD at a given time. It is equal to the product having the highest assigned units value of all the products running on one UHD at a given time.

Total checked out units: Sum of the UHD running totals of all of the UHDs.

Available Units: Licensed units minus total checked out units.

Required Units: Number of units required to start a new product run on one UHD. If the assigned units for the new product are larger than the UHD running total, the required units=the assigned units of the new product—the UHD running total. If the assigned units for the new product are less than or equal to the UHD running total, then the required units=zero.

Returned units: Number of units returned when a product is terminated by one UHD. If the assigned units of the terminated product are less than the UHD running total, then the returned units=zero. If the assigned units for the terminated product are equal to the UHD running total, then the returned units=the assigned units for the terminated product—the next highest assigned units value of the remaining products running on the UHD.

FIG. 2 also depicts another unique feature of the present invention in which each products A–H of the program suite 24 is provided with a pre-determined number of assigned units. The actual number of assigned units assigned to each product A–H in the program suite 24 can be arbitrarily chosen, and the number of assigned units for two or more programs can be identical or different.

By way of example only, the number of assigned units assigned to each product A–H is selected as a function of one license price of each product or program divided by an arbitrary factor. By example only, the lease price of each product is divided by $250 to yield the number of assigned units assigned to each product in the program suite 24. It will also be understood that the number of assigned units assigned to each product A–H may also be based on the size of the individual products, the amount of time typically employed to run each product, or its inherent value to an end user in a particular application.

In a broad sense the present licensing method includes the steps of a. providing a program suite formed of a plurality of software programs,
b. assigning a predetermined number of assigned units to each program in the program suite, and
c. setting a discrete node running total for each node equal to the highest assigned units program running on each respective node by leveling the number of units charged to each node to be equal to the highest assigned units program running on each node.

Each node is thereby capable of running additional programs where the assigned units of the additional programs are equal to or less than the node running total without changing the node running total.

Initially, the license manager 10 recognizes the total number of licensed units purchased or made available to a group of users in a network. This total number of licensed units can be paid in any of a number of ways, each primarily based on a license term or period, such as one year, for example only. The license royalty or fee will be based on a certain price per license unit, such as $250 per license unit in the above example. However, the number of licensed units purchased by this license fee covers the complete license term, such as one year, for example, but acts as a cap limiting the number of individual programs or products, as described hereafter, which can be executed or run simultaneously on the network 12. To state this another way, the total checked out units at a given time cannot exceed the number of licensed units paid for by the licensee or entity controlling the network 12.

An UHD running total is generated for each unique UHD and equals the highest assigned units program running on each UHD. The sum of all of UHD running totals of each of the UHDs equals the total checked out units which are subtracted from the licensed units to form the available units. The available units are used to determine if another UHD or even the same UHD already running a program can execute any of the products A–H in the program suite 24.

Access to other products in the program suite 24 based on the unique "leveling" method can be seen more clearly by reference to FIGS. 3A–3D and FIGS. 4A and 4B.

First, it is assumed that a purchaser obtains 100 licensed units for use of the program suite 24. In all examples of FIGS. 3A–3D, a UHD (UHD1) is currently running three products or programs, including two copies of product A and one copy of product H. As product H has a higher number of assigned units (38) than the assigned units (21) of product A, the UHD running total of the UHD1 is set equal to the assigned units of product H (38). The UHD1 running total (38) is then subtracted from the licensed units (100) to compute the available units (62).

Figure 4A:
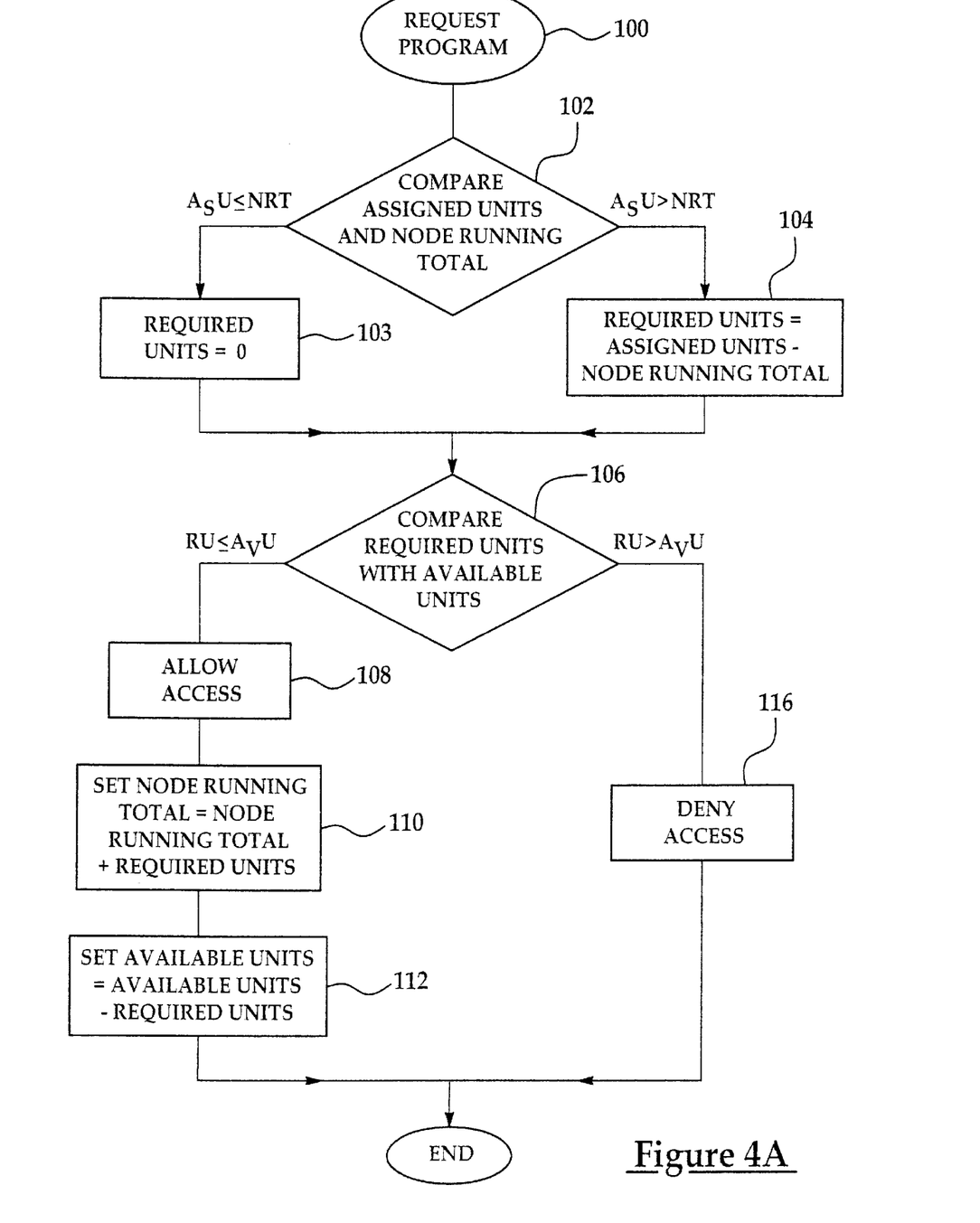
FIG. 4A is a flow chart of the required units determination according to the present invention.

If UHD1 wishes to concurrently run another one of the products A–H in the program suite 24, which new product can be another copy of an existing product A or H which is currently running on UHD1 or an entirely different product from the program suite 24, UHD1 requests access in step 100, FIG. 4A, from the license manager 10 to execute the new product.

Figure 3A:
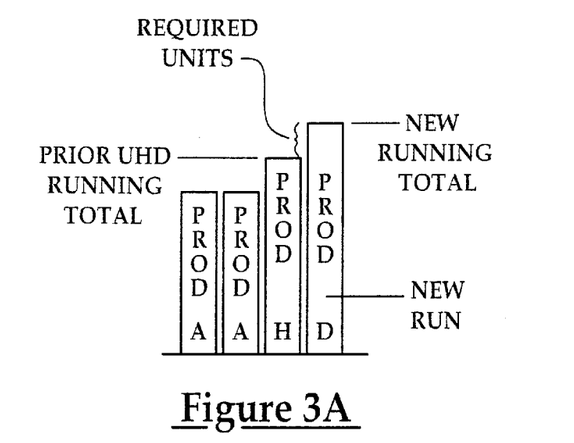
FIGS. 3A–D are pictorial representations of the unit leveling function according to the present invention.

In the example of FIG. 3A, UHD1 requests an access to product D. The license manager 10 first computes the required units for UHD1 to start running product D by comparing the UHD1 running total (38) with the (50) assigned units of requested program D in step 102, FIG. 4A. Since the (50) assigned units of the requested program D are greater than the UHD1 running total (38), the UHD running total (38) is subtracted, in step 104, FIG. 4A, from the (50) assigned units of program D to compute the required units (12).

With the required units established, the license manager 10 then compares the (12) required units with the (62) available units in step 106, FIG. 4A. Since the (12) required units are smaller than the (62) available units, the license manager 10 allows access to the requested program by UHD1 in step 108.

The (12) required units are added to the UHD1 running total (38), in step 110, FIG. 4A, to compute the new UHD1 running total (50). The new UHD1 running total (50) is also equal to the number of assigned units (50) of product D. Thus, the node running total for the node is leveled at the highest assigned program, product D, now running on the node. Also, the (12) required units are subtracted from the (62) available units in step 12, FIG. 4A, to compute the new available units (50).

Of course, if the number of available units was less than 12 due to other UHDs concurrently running programs from the program suite, the license manager 10 would determine in step 106, FIG. 4A, that the number of required units is greater than the available units and will deny access to the UHD1 for the requested program in step 116, FIG. 4A, and notify the user. At this time, the license manager 10 maintains the UHD1 running total and the number of available units unchanged.

Figure 3B:
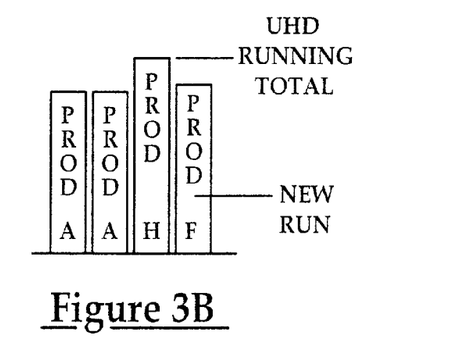

In another example shown in FIG. 3B, UHD1 wishes to execute product F. The license manager 10 will determine in step 102 that product F has a lower assigned units (24) than the UHD1 running total (38). The license manager then sets the required units to zero in step 103, and determines in step 106 that the required units are less than the available units. The license manager 10 will then allow access to product F in step 108. The UHD1 running total (38) and the available units (62) will remain unchanged in steps 110 and 112 respectively. Thus, the node running total for the node is leveled at the highest assigned program, product H, now running on the node, which is unchanged from the previous level.

Figure 3C:
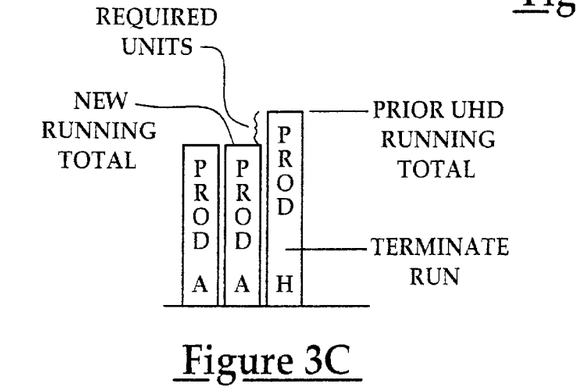
Figure 4B:
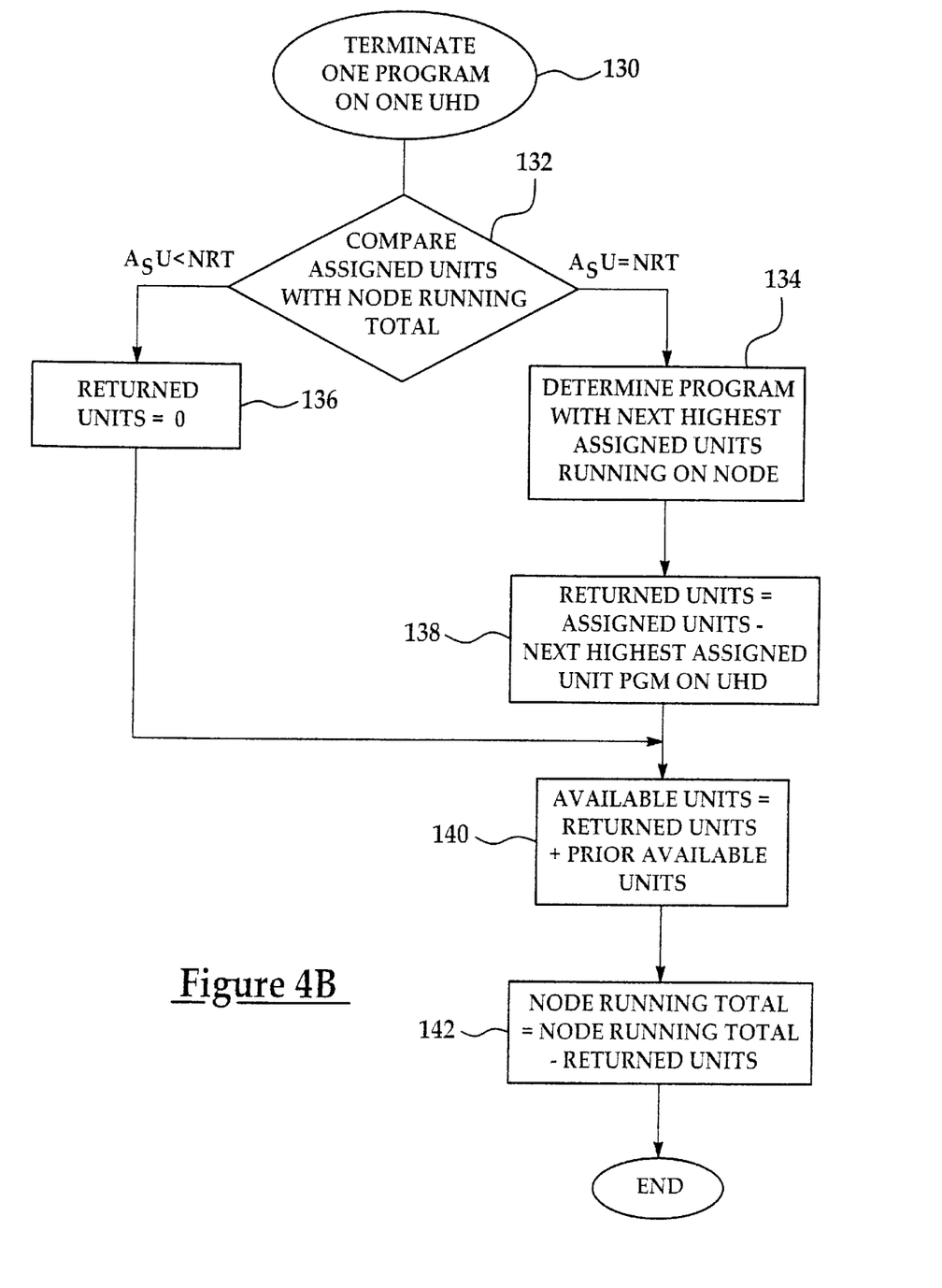
FIG. 4B is a flow chart of the returned units determination according to the present invention.

In the example shown in FIG. 3C, UHD1 terminates execution of product H in step 130 in FIG. 4B. The license manager 10 compares the assigned units of the terminated program with the UHD1 running total in step 132, and in this example, determines that the assigned units (38) of product H and the UHD1 running total (38) are equal. The license manager 10 then determines in step 134 that of the products currently running on UHD1, product A has the next highest assigned units (21). The license manager 10 then subtracts, in step 138, the (21) assigned units of product A from the (38) assigned units of the terminated product H to compute the returned units (17). The license manager 10 then adds the (17) returned units to the (62) available units in step 140 to compute the new available units (79). The license manager 10 then subtracts the (17) returned units from the UHD1 running total (38) in step 142 to compute the new UHD1 running total (21). This new UHD1 running total (21) is also equal to the assigned units (21) of product A. Thus, the node running total for the node is leveled at the highest assigned program, product A, now running on the node.

Figure 3D:
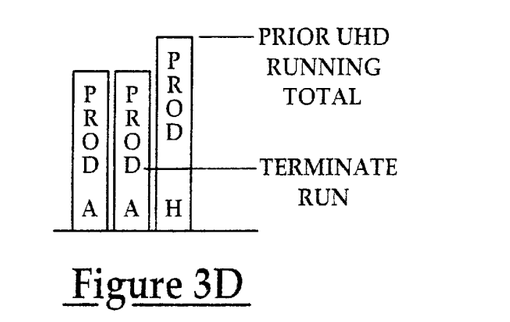

Finally, in the example shown in FIG. 3D, UHD1 terminates execution of one of the copies of product A in step 130. The license manager 10 determines in step 132 that the (21) assigned units of product A are smaller than the UHD1 running total (38). The license manager 10 then sets returned units=0 in step 136. The (62) available units and the UHD1 running total (38) remain unchanged in steps 140 and 142 respectively. Thus, the node running total the node is leveled at the highest assigned program, product H, now running on the node, which is unchanged from the previous level.

It should be noted that when calculating the returned units, the assigned units cannot be greater than the UHD running total.

The above examples in FIGS. 3A–3D have been described as if only one UHD was active on the network at a time. Of course, the more typical situation is that multiple UHDs will be active at one time, each requesting one or more programs from the program suite at random times and each individually operating one or more programs at the same time. However, the above sequence of steps to determine if each UHD that requests access to one program in the program suite will be given or denied access to the requested program is the same. The impact of other UHDs simultaneously running programs from the program suite is addressed by the number of available units at the time of each program request by any UHD. Thus, although each UHD will have its UHD running total calculated as described above as equaling the highest assigned units program being run by each respective UHD, each UHD running total, when summed with other UHD running totals to form a number of total checked out units, will reduce the number of available units. This will be a determining factor as to whether the next UHD requesting access to a program in the program suite will obtain or be denied access to its requested program.

The use of the method described above and shown in FIG. 4A for multiple UHDs on the network 12 will now be described with reference to the following example. First, it is assumed that a purchaser licenses 100 licensed units for use of the program suite 24. If UHD1 first accesses the network 12 and is allowed access to product A, the (21) assigned units of product A will be set as the required units and be deducted from the available units (100) to compute the new available units (79). A second UHD2 may then request access the network 12. Assuming that the second UHD2 requests execution of product A, the license manager 10 through the above sequence allows UHD2 to access product A and sets as the UHD2 running total equal to the assigned units (21) of product A. The license manager 10 then deducts 21 units from the (79) available units to compute the new available units (58).

If UHD1 then wishes to additionally execute product D, which has 50 assigned units. The UHD1 running total (21) is then subtracted from the (50) assigned units of product D to compute the required units (29). Since the (29) required units are less than the (58) available units, access to product D is allowed and the (29) required units are deducted from the (58) available units to compute the new available units (29).

Another UHD, such as UHD3 for example, may then request a program from the program suite 24. If UHD3 also wishes to execute product A, the above described sequence determines that the required units for use of product A by UHD3 are 21, which are deducted from the (29) available units to compute the new available units (8).

Continuing with this example, any UHD other than UHD1, UHD2 or UHD3, can subsequently only execute programs c or e which have assigned units less than the remaining (8) available units.

In the above example, UHD1 is executing products A and D. Simultaneously, UHD2 and UHD3 are each also executing product A. Due to the leveling method described above, UHD1 may execute any other product in the program suite 24 having an assigned units value less than the UHD1 running total (50). Thus, UHD1 may execute yet another copy of product A or any one or more of products B, C, E, F, G or H since all of these products have assigned units less than the current UHD1 running total.

UHD2 and UHD3 may likewise gain access to additional products in the program suite 24, where the additional products have assigned units less than the UHD running totals of UHD2 (21) and UHD3 (21), respectively, or a required units value equal to or less than the number of available units (8).

This licensing arrangement provides users with an easy access to all of the programs in the program suite. The customer may install all of the programs in the program suite on the customer's network of computer, and all of the programs are managed by the same license manager. All programs are available to users at all times without requesting additional installations or license managers, thus making it easy for the users to access any of the programs in the program suite.

This licensing arrangement encourages individual UHDs on the network 12 to try out other products or programs in the program suite 24 with a very small number, often zero, of required units, thus minimizing the adverse impact on the simultaneous usage of the program suite 24 by other UHDs. This provides a significant incentive for the users to try out new products.

This license arrangement also encourages users to run multiple copies of the multiple program. When one program is running on a UHD, the user may run multiple copies of the same program without increasing the UHD running total or decreasing the available units. Similarly, the user may run one or more copies of other programs that have assigned units smaller than the assigned units of the first program, again without increasing the UHD running total or decreasing the available units. This provides a significant incentive to the user to run multiple copies of multiple products on the same UHD.

The above three advantages have the potential to significantly enhance the effectiveness of a UHD in completing an assignment or multiple assignments in a shorter time. This, in turn, would increase the efficiency of an organization.

Additionally, this licensing arrangement minimizes the number of licenses a customer must license to use the programs in the program suite. Since the same licensed units may be used to run any and all of the programs in the program suite, a purchaser has to now license units to cover the peak checked out units of all program products rather than separate licenses for to cover the peak usage of each product separately. This has a potential to provide the customer with significant savings in licensing these products, thus improving their profitability.

This licensing setup will increase the usage of all products in the program suite because it increases the efficiency of a user. This would lead to an increase in the peak checked out units for a given customer. The purchasers would see the value provided by this licensing setup and would purchase additional licensed units required for smooth and uninterrupted functioning of each user in their organization. This is the unique and valuable business opportunity offered by this licensing setup.

Figure 5:
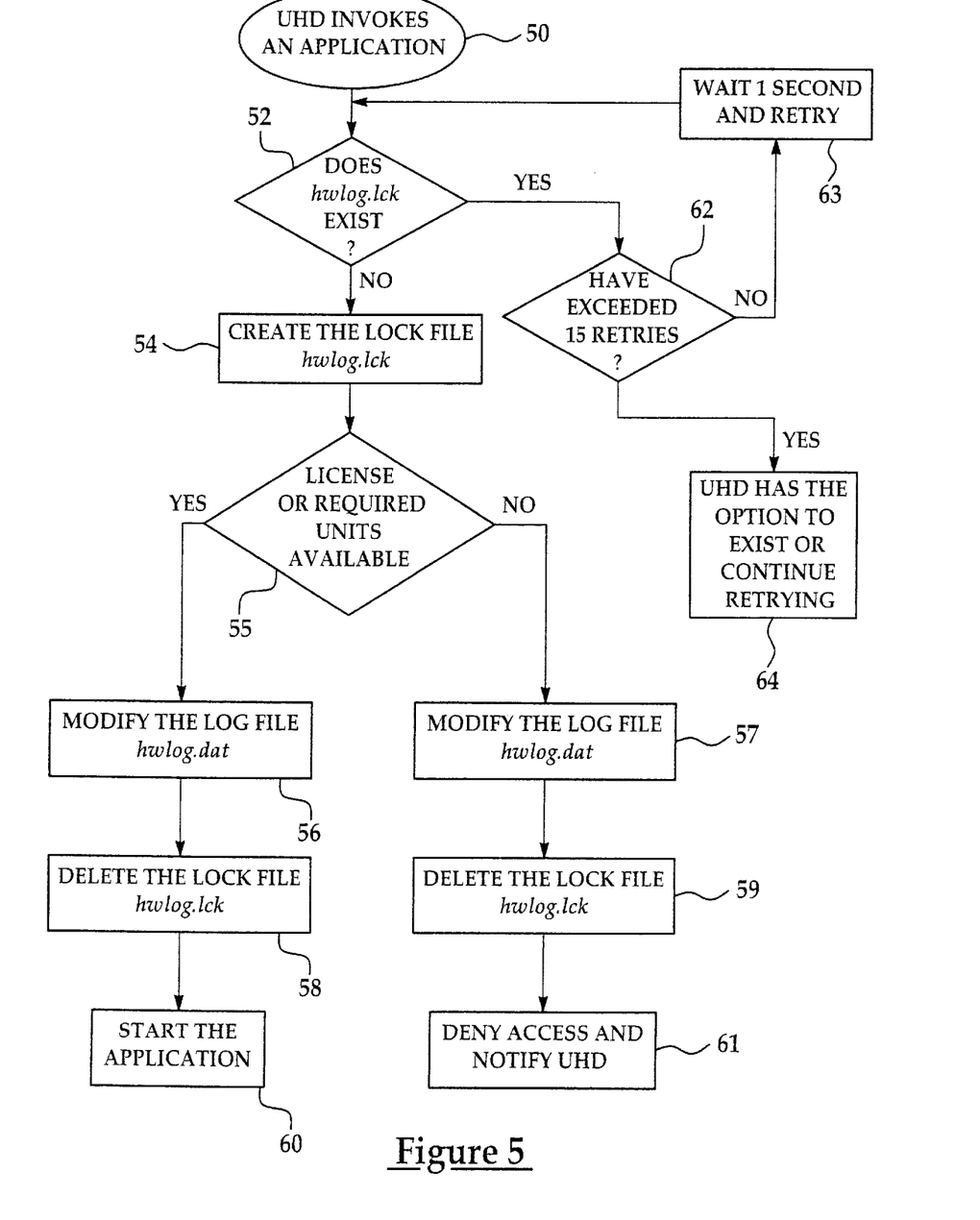
FIG. 5 is a flow chart depicting the operation of the Log File routine of the present invention.

The license manager 10 also controls the operation of a Log File routine, shown as an example in FIG. 5, as part of granting each UHD access to the network 12. The license manager 10 executes the routine shown in FIG. 5 upon each access request of an UHD on the network 12. In step 50, one UHD, requests access to one of the products in the program suite 24. The license manager 10 then determines in step 52 if the lock file hwlog.lck exists. If the lock file hwlog.lck does not exist, the license manager 10 creates the lock file hwlog.lck in step 54 for the particular UHD requesting access to the network 12. The existence of the lock file hwlog.lck temporarily prevents new access to the network 12 by any other UHD or a second request for access by the first UHD.

Next, the license manager 10, in step 55, determines if a license or the number of required units are available. If the answer is yes, the license manager 10 opens or updates a hwlog.dat file in step 56 for the UHD with the name of the program or product that the UHD has requested from the program suite 24, the assigned units associated with the requested program, and the start time. It should be noted that the hwlog.dat file for the particular requesting UHD will already contain other program data, assigned units and an UHD running total based on any other program(s) currently being executed by the requesting UHD.

The license manager 10 then completes the leveling function described above and shown in FIG. 4A for the requesting UHD, updates or modifies the UHD running total of the requesting UHD if the required units are available from the available units and stores the new data in the hwlog.dat file.

Upon completion of these tasks, the license manager 10 deletes the hwlog.lck file in step 58 and allows the requesting UHD to start the requested product in step 60. The deletion of the hwlog.lck file now will allow processing of any new requests to access network 12 by any UHD.

If the required units or a license are not available in step 55, the license manager 10 recording in step 57 updates the log file hwlog.dat for the requesting UHD by storing which product was requested and failed to run, and the reason for the failure to run, such as the required units or a license were not available. The license manager 10 then deletes the lock file hwlog.lck in step 59 and notifies the UHD in step 61 the access was denied.

Back in step 52, if a hwlog.lck file does exist, the license manager 10 then puts the request in wait and retry mode in steps 62 and 63. The number of retries is set arbitrarily at 15. The license manager 10 executes the routine shown in FIG. 5 consisting of step 62, a one second wait period in step 63, and a retry of step 52 until either it finds in one of the retries that the hwlog.lck file no longer exists, or the total number of 15 retries has been reached. If the license manager 10 has completed 15 retries and the hwlog.lck file still exists, the license manager 10, in step 64, notifies the requesting UHD to exit or to continue retrying.

The above described Log File method provides several additional features and advantages in the present license management apparatus and method. First, the license manager 10, by controlling the access of each UHD to the licensed products in the program suite 24, is able to maintain a data file containing information on the number of times each product has been accessed by any of the UHDs on the network 12, the length of run or execution time of each product, which products have been run by each individual UHD, etc. This information is useful to the licensee since the licensee will be able to determine how many licensed units the licensee really needs. This feature is useful to the licensor since the licensor will be able to determine the usage of each product and assign development resources to each product based on that information.

In the above discussion the locking out of additional request was done by creating a hwlog.lck file. However, the same can be achieved by any other means by which a lock state can be set. Also, the hwlog.dat file may be a combination of multiple files stored on disks and/or data stored in memory.

Another optional feature provided by the Log File sequence is an overdraft function which can be provided by the license manager 10. The licensor may provide an overdraft function which enables a particular licensee to exceed the total licensed units by a pre-established number of overdraft units or for a pre-established time or for the use of only certain products in the program suite 24. For example, an additional 50 un-purchased overdraft units may be provided as an overdraft protection which will enable UHDs to gain access to the network 12 to execute products or programs in the program suite 24 even though total licensed units have been exceeded or an insufficient number of available units remain to fully support the product desired to be accessed by an UHD. This feature enables the next requesting UHD to smoothly conduct its business without delay. The license manager 10 is capable of producing a report indicating the number of times, the amount of time, etc., in which the overdraft feature was invoked. This provides additional value to the licensee where the licensee may now purchase number of licensed units that would ensure that all UHDs can access network 12 at almost al of the time. The state of peak checked out units generally occurs only occasionally and lasts for only short time duration. The overdraft units would then allow the UHDs to continue accessing the network when the state of peak checked out units occurs. This feature also provides helpful information which would help the licensee decide whether and how many additional licensed units should be purchased in order to ensure that all UHDs continue to access network 12 as and when required.

Figure 6:
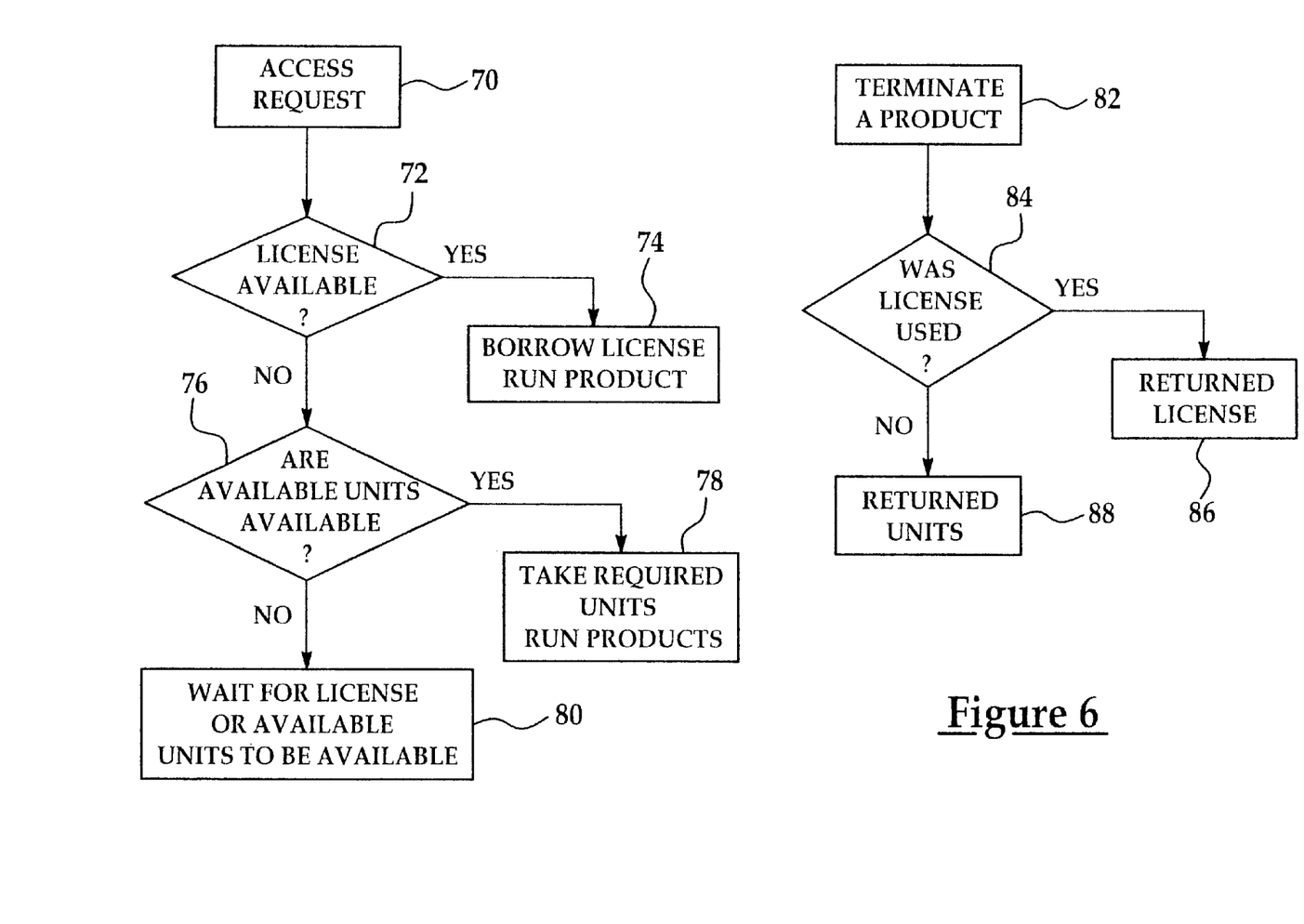
FIG. 6 is a flow chart depicting the combination licensing routine of the present invention.

Another aspect of the licensing apparatus and method of the present invention involves a combination of a conventional license and a license using unit leveling for a single licensee as shown in FIG. 6. The conventional portion of the combination license shown in FIG. 6 involves a licensee prepaying or agreeing to pay a royalty for each use of a licensed product which is part of the licensed program suite 24. In this more conventional licensing arrangement, each product in the program suite 24 is licensed for a predetermined number of concurrent uses on the network.

Thus, as shown in step 70 in FIG. 6, an access request by one of the UHDs is detected by the license manager 10 which then determines in step 72 if a license is available for the particular product or program in the program suite 24. If a license is available, the license manager 10 deducts one license from the licensed total for the requested product and allows the requesting UHD to execute the requested product in step 74. If a license is not available, the license manager 10 then determines if there are sufficient available units in step 76 to access the program. If there is a sufficient quantity of available units to run a requested product, i.e. the available units are greater than or equal to the required units of the requested product or program, the license manager 10 in step 78 allows the requested UHD to execute the program and deducts the required units from the available units.

If sufficient available units are not available, the license manager 10 in step 80 advises the requesting UHD to wait for a license on a particular requested program to become available through a termination of an existing conventional license on the same program to another UHD or for more available units to become available by termination of other products by other UHDs on the network, or to terminate the request and try later.

As in units leveling, a UHD may run multiple copies of the same product using a single license of the product. Thus, in step 72 if one UHD is already running one product, and the new request from the one UHD is for the same product, the license manager determines that the license for that product is already available to the UHD. Thus, a new license is not checked out, and the UHD is allowed to start the new run of the product in step 74.

As also shown in FIG. 6, once a particular UHD on the network 12 terminates the execution of a product in step 82, the license manager 10 determines in step 84 if a conventional license was used. If a license was used, and no more runs of the same product are currently active on the UHD, the license manager 10 in step 86 returns the previously granted conventional license to an available license status if in step 84 it was determined that a license was not used, the returned units are calculated and added to the available units in step 88.

In another aspect of the program suite licensing method and apparatus of the present invention, programs which form the program suite are actually owned and supplied by at least two different software vendors or owners. To the UHDs, which programs belong to which vendor or owner is of no practical significance as all of the programs together form the program suite and are available to the UHD with a preset number of assigned units and can be accessed according to the various license arrangements described above.

Such an arrangement could, in one exemplary application, enable a licensee to pick and choose which additional programs it desires to be offered as part of the program suite containing other programs or products, such as products A–H. Such additional or participant programs can be provided with assigned units chosen in the same manner described above.

However, a difference occurs when licensing revenue is split between the owner of the products A–H and the owner of the additional participant products or programs which are added to the program suite. Although the licensing revenue can be split according to which programs are run, in one example, the owner of the products A–H would receive 20%, for example, of any licensing revenue generated by use of any additional participant programs added to the program suite, with the participant who owns or supplies the additional programs receiving the remaining 80% of any license fees attributable to use of its programs.

Further, the license fees paid by a user for use of the participant programs can include a fixed component applying a dollar amount to a first selected number of licensed units, such as the first 50 licensed units, for use of a participant program, and a variable component that applies to each licensed units over the first 50 licensed units.

In summary, there has been disclosed a unique licensing method which overcomes certain deficiencies encountered in previous licensing arrangements involving program suites containing many individually selectable computer programs. By establishing an UHD running total equal to the highest assigned units of any program run by an individual UHD on a computer network, the UHD is encouraged to sample and run other programs in the program suite having the same or lower assigned units since the other programs can be run without requiring additional units from the available units pool. Further, since each UHD is charged with an UHD running total equal only to the assigned units of the highest assigned units program executed by the UHD, each UHD is free to run additional lower assigned units programs, as well as multiple copies of such programs, and even multiple copies of the highest assigned units program without requiring additional units which could potentially block access to the entire program suite for subsequent users. This invention would lead to a higher efficiency and profitability in the licensee's organization.

What is claimed is:

1. For use in a computer network having a plurality of nodes, each node capable of operating a software program obtained from a program source, a licensing method comprising the steps of:
   a. on a computer network, providing a program suite formed of a plurality of software programs;
   b. assigning a predetermined number of assigned units to each program in the program suite;
   c. setting a discrete node running total for each node equal to the assigned units of the highest assigned units program running on each node: and
   d. upon one node requesting access to another requested program in the program suite while accessing a first program, determining a number of required units to access the requested program where the number of required units equal zero when the assigned units of the requested program are less than or equal to the node running total of the node requesting access to the requested program, and the required units equal the difference between the assigned units of the requested program and the node running total when the assigned units of the requested program are greater than the one node running total.

2. The method of claim 1 further comprising the steps of:
   e. providing a predetermined number of licensed units for use of the programs in the program suite;
   f. calculating a sum of all node running totals;
   g. setting a number of checked out units equal to the sum of all node running totals;
   h. setting an available units equal to the predetermined number of licensed units less the checked out units; and
   i. comparing the required units with the available units and allowing access to the requested program by the requesting node where the required units are less than or equal to the available units and denying access to the requested program where the required units are greater than the available units.

3. The method of claim 2 wherein steps d and i are repeated for each requested program by the one node.

4. The method of claim 2 further comprising the step of repeating steps d through i for each node requesting access to a program in the program suite.

5. The method of claim 2 further comprising the steps of:
   after allowing access to the requested program, setting the node running total to equal the node running total plus the required units and setting the available units to equal the available units minus the required units.

6. The method of claim 2 further comprising the steps of:
   after denying access to the requested program, leaving the node running total and the available units unchanged.

7. The method of claim 2 further comprising the steps of:
   upon one node terminating a run of one program currently running on the one node:
   j. determining a number of returned units where the returned units equal zero when the assigned units of the terminated program are less than the node running total of the node terminating the program, and where the returned units equal the difference between the assigned units of the terminated program and the next highest assigned units program running on the one node when the assigned units of the terminated program are equal to the node running total of the node terminating the program; and k. upon terminating the run of the program, adding the returned units to the available units to compute a new available units, and subtracting the returned units from the node running total to compute a new node running total.

8. The method of claim 7 wherein steps j and k are repeated for each terminated program by the one node.

9. The method of claim 7 further comprising repeating steps j and k for each node terminating a program in the program suite.

10. The method of claim 1 further comprising the step of assigning different numbers of assigned units to at least two of the programs in the program suite.

11. The method of claim 2 further comprising the steps of:

providing a predetermined number of licenses for each program in the program suite;

determining if a license is available for a requested program in the suite;

if a license is available, using the license and running the program;

if a license is not available for requested program, repeating steps d andi.

12. The method of claim 1 further comprising the steps of:

maintaining usage data including at least one of the total running time, and the number of separate executions for one node running a selected program for each program from the program suite run on the network.

13. The method of claim 1 wherein further comprising the step of defining each node as a unique combination of a user, a processing unit, and a display.

14. A computer readable medium for use in a computer network of nodes, each node capable of operating a software program obtained from a program source, the computer readable medium containing program instructions for:

a. on a computer network, providing a program suite formed of a plurality of software programs;

b. assigning a predetermined number of assigned units to each program in the program suite;

c. setting a discrete node running total for each node equal to the highest assigned units program running on each respective node by leveling the number of units charged to each node to be equal to the highest assigned units program running on each node; and d. upon one node requesting access to another requested program in the program suite while accessing a first program, determining a number of required units to access the requested program where the number of required units equal zero when the assigned units of the requested program are less than or equal to the node running total of the node requesting access to the requested program, and the required units equal the difference between the assigned units of the requested program and the node running total when the assigned units of the requested program are greater than the one node running total.

15. The computer readable medium of claim 14 further comprising the steps of e. providing a predetermined number of licensed units for use of the programs in the program suite;

f calculating a sum of all node running totals;

g. setting a number of checked out units equal to the sum of all node running totals;

h. setting an available units equal to the predetermined number of licensed units less the checked out units; and i. comparing the required units with the available units and allowing access to the requested program by the requesting node where the required units are less than or equal to the available units and denying access to the requested program where the required units are greater than the available units.

16. The computer readable medium of claim 15 containing program instructions wherein steps d and i are repeated for each requested program by the one node.

17. The computer readable medium of claim 15 containing program instructions for repeating steps d and i for each node requesting access to a program in the program suite.

18. The computer readable medium of claim 15 containing program instructions for, after denying access to the requested program, leaving the node running total and the available units unchanged.

19. The computer readable medium of claim 15 containing program instructions for, after allowing access to the requested program, setting the node running total to equal the node running total plus the required units and setting the available units to equal the available units minus the required units.

20. The computer readable medium of claim 15 containing program instructions for:

upon one node terminating a run of one program currently running on the one node:

j. determining a number of returned units where the returned units equal zero when the assigned units of the terminated program are less than the node running total of the node terminating the program, and where the returned units equal the difference between the assigned units of the terminated program and the next highest assigned units program running on the one node when the assigned units of the terminated program are equal to the node running total of the node terminating the program, and k. upon terminating the run of the program, adding the returned units to the available units to compute a new available units, and subtracting the returned units from the node running total to compute a new node running total.

21. The computer readable medium of claim 20 containing program instructions for repeating steps j and k for each program terminated by the one node.

22. The computer readable medium of claim 20 containing program instructions repeating steps j and k for each node terminating a program running on the node.

23. The computer readable medium of claim 14 containing program instructions for assigning at least two of the programs in the program suite different numbers of assigned units.

24. The computer readable medium of claim 15 containing further program instructions for:

providing a predetermined number of licenses for each program in the program suite;

determining if a license is available for a requested program in the suite;

if a license is available, using the license and running the program, and if a license is not available for requested program, repeating steps d and i.

25. The computer readable medium of claim 14 containing further program instructions for;

maintaining usage data including at least one of the total running time, and the number of separate executions for one node running a selected program for each program from the program suite run on the network.

26. The computer readable medium of claim 14 containing further program instructions for;

defining each node as a unique combination of a user, a processing unit, and a display.

27. For use in a computer network of nodes, each node capable of operating a software program obtained from a program source, a licensing method comprising the steps of:

providing a program suite formed of a plurality of software programs, the programs originating from at least two distinct sources;

assigning a predetermined number of assigned units to each program in the program suite;

providing a predetermined number of licensed units for use of the programs in the program suite; and distributing revenue to the different sources of programs in the program suite.

28. A computer readable medium for use in a computer network of nodes, each node capable of operating a software program obtained from a program source, the computer readable medium containing program instructions for:

providing a program suite formed of a plurality of software programs, the programs originating from at least two distinct sources;

assigning a predetermined number of assigned units to each program in the program suite;

providing a predetermined number of licensed units for use of the programs in the program suite; and distributing revenue to the different sources of programs in the program suite.

* * * * *